United States Patent
Moroney et al.

(10) Patent No.: US 9,773,021 B2
(45) Date of Patent: Sep. 26, 2017

(54) CORRECTED OPTICAL PROPERTY VALUE-BASED SEARCH QUERY

(71) Applicant: Hewlett-Packard Develop Company, L.P., Houston, TX (US)

(72) Inventors: Nathan Moroney, Palo Alto, CA (US); Ehud Chatow, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 829 days.

(21) Appl. No.: 13/754,287

(22) Filed: Jan. 30, 2013

(65) Prior Publication Data
US 2014/0214802 A1 Jul. 31, 2014

(51) Int. Cl.
*G06F 7/00* (2006.01)
*G06F 17/30* (2006.01)

(52) U.S. Cl.
CPC ............... *G06F 17/3025* (2013.01)

(58) Field of Classification Search
CPC ......... G06F 17/30864; G06F 17/30867; G06F 17/30991; G06F 17/30696; G06F 17/30011; G06Q 30/02; G06Q 10/10
USPC ...................................... 707/736
See application file for complete search history.

(56) References Cited

U.S. PATENT DOCUMENTS

| | | | |
|---|---|---|---|
| 6,253,201 B1 * | 6/2001 | Abdel-Mottaleb et al. | |
| 6,445,822 B1 * | 9/2002 | Crill et al. | 382/218 |
| 6,594,386 B1 * | 7/2003 | Golshani et al. | 382/166 |
| 6,724,422 B1 * | 4/2004 | Werner | 348/187 |
| 8,503,767 B2 * | 8/2013 | Sun et al. | 382/159 |
| 2010/0166339 A1 | 7/2010 | Gokturk et al. | |
| 2011/0064301 A1 | 3/2011 | Sun et al. | |
| 2011/0196864 A1 | 8/2011 | Mason et al. | |
| 2012/0269432 A1 * | 10/2012 | Wang et al. | 382/171 |

OTHER PUBLICATIONS

M. Ewald, "Content-based image indexing and retrieval . . . ," Transactions on Machine Learning and Data Mining, 2009.
N. Kumar et al., "Describable visual attributes for face verification and image search," IEEE Transactions on Pattern Analysis and Machine Intelligence, Oct. 2011.
T. Yeh et al., "Sikuli: Using GUI screenshots . . . ," Proceedings of UIST'09, Oct. 4-7, 2009.

* cited by examiner

Primary Examiner — Robert Beausoliel, Jr.
Assistant Examiner — Michael Pham
(74) Attorney, Agent, or Firm — Michael A. Dryja

(57) ABSTRACT

A corrected optical property value of an optical property of interest captured within a digital image is determined. A search query based on the corrected optical property value is determined. A database is searched using the search query to determine search results for the search query that have appearance attributes with optical properties at least similar to the corrected optical property value.

16 Claims, 3 Drawing Sheets

CORRECTED OPTICAL PROPERTY VALUE-BASED SEARCH QUERY

BACKGROUND

Color and other optical properties are an important consideration for many types of users. For example, a car buyer may be interested in purchasing a car having a particular shade of red. As another example, interior decorators may want to select paint having a particular texture.

DETAILED DESCRIPTION

Figure 1:
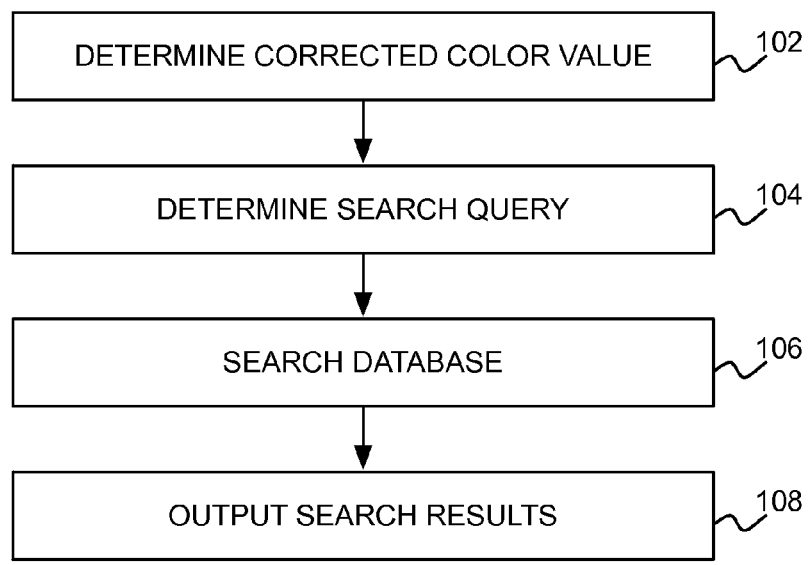
FIG. 1 is a flowchart of an example method for acquiring search results that match a color of interest captured within a digital image.

As noted in the background, color and other optical properties an important consideration for many different types of users. A car buyer may not just be interested in red cars per se, but rather a car having a particular shade of red. Many users do not know the precise name of a particular color of interest, and indeed, the same shade of a given color may be called different names by different vendors. This means that existing search engines, which return results responsive to textual search queries, can be unhelpful. For example, entering in the search query "red car," will likely not reveal the exact shade of red a user has in mind.

Techniques disclosed herein overcome these shortcomings. An uncalibrated digital image captures a physical scene including at least an optical property of interest, such as a particular color, and which can also include a physical optical property calibration chart, such as a physical color calibration chart. A corrected optical property value that accurately denotes the optical property of interest within the image is determined, such as based on the physical chart captured within the image as well, and an appearance-encoded search query is determined based on the corrected optical property value. A database can be searched using the search query to locate search results that have appearance attributes with optical properties at least similar to the corrected optical value.

For example, a user may want a color of paint to paint his or her house that matches a color of a building. The user captures an image of the building using his or her smartphone. Most smartphones and other types of mobile devices capture uncalibrated digital images that do not capture color with the required color accuracy. Even the few such devices that do may not be able to accurately capture the color the user sees, because of the lighting and other variables of the scene or environment in which a picture is being taken. Therefore, a corrected color value is determined that accurately denotes the color the user has seen, such as a numeric definition of the color in a predetermined color space.

A search query including this corrected color value and the phrase "exterior house paint" can then be used to search a general-purpose database. The corrected color value may be used by itself to search a special-purpose database for the product of interest, such as exterior house paint. The user thus receives search results of exterior house paint colors that best match the color of the building that the user saw and captured a digital image of, from which the user may select a desired color to purchase and paint his or her house.

In some implementations, a user thus just has to bring along a small chart when out and about to accurately identify colors or other optical properties of interest that the user sees. The user can use his or her smartphone to capture an image of a discovered color or other optical property of interest with the chart placed alongside. This optical property of interest is convertible to a corrected optical property value that accurately describes the optical property of interest, because the calibration chart has been digitally captured under the same conditions as the optical property of interest itself. The corrected optical value is used as the basis upon which a search query is generated, which is then used to search a database to receive search results having appearance attributes with optical properties at least similar to the corrected optical value.

The remainder of the detailed description is described in relation to color as an example optical property. However, the techniques disclosed herein are applicable to optical properties other than color as well. Examples of such other optical properties include texture, translucence, gloss, and pearlescence, among others.

FIG. 1 shows an example method 100. The example method 100 can be implemented at a system. The system may be or include a computing system that is provided by a service provider, such as a search engine provider or another type of service provider. This computing system may interact with devices of users, such as mobile devices like smartphones. The system may include the mobile device as well. For instance, some parts of the method 100 may be performed by the computing system, and other parts performed by a mobile or other device. Specific example implementations in such respects are described later in the detailed description, with reference to FIGS. 2 and 3.

A corrected color value is determined from a color of interest within a digital image (102). For instance, a device such as a mobile device, like a smartphone, a standalone digital camera, and so on, can capture an uncalibrated digital image of a physical scene that includes a color of interest and a physical color calibration chart. The mobile device can be a device that is not a professional color-capturing device. That is, the digital images that the mobile device captures are uncalibrated, in that the image-capturing mechanism of the mobile device, such as a charged coupled device (CCD) or a contact image sensor (CIS), is not able to be color calibrated or has not been color calibrated.

The physical scene is likewise uncalibrated, in that the lighting conditions and other variables that impact color rendition and accuracy within the digital image may not be ideal, and are typically not specified to any great degree of accuracy, if at all. For example, the physical scene may be an outdoors scene in which a user of the mobile device happens to be currently located, an indoor location such as a shopping mall, and so on. The user may happen upon a physical object that has the color of interest, for instance, during the normal course of his or her day.

In both these respects—from a device standpoint and from a scene or environmental standpoint—the digital image is said to be uncalibrated. Besides the color of interest, the digital image includes the physical color calibration chart. The physical color calibration chart permits the color of interest to be accurately determined, insofar as the chart can have predetermined and preselected colors and has its picture taken as part of the same image, under the same conditions and using the same device, as the color of interest itself.

A color chart as used herein is intended to encompass any suitable physical color reference comprised of a set of colors selected to enable generation of a color profile. Such a color profile can be used, for example, for color calibration of a device or color correction of an image. A color chart may be constituted as a flat, physical object colored with an arrangement of standardized color samples (e.g., a plurality of color patches). Color charts, such as the X-Rite color checker, may be rectangular and have a selected size and color patch layout.

The corrected color value of the color of interest can be determined based on the physical color calibration chart and the color of interest as captured within the uncalibrated digital image. The corrected color value is an accurate measurement of the color of interest that corrects for the uncalibrated nature of the digital image. That is, the corrected color value is an accurate measurement of the color of interest even though the digital image was captured using an uncalibrated device and under not precisely known lighting and other environmental conditions. For example, the corrected color value may be represented as a series of color coordinates within a color scale like the CIELAB color scale, as a number of color channel values of the constituent color channels of a predetermined color space, and so on.

Determination of the corrected color value can be achieved as described in one or more of the previously referenced copending patent applications. The color calibration chart is captured in the same image as the color of interest, using the same device and under the same environmental conditions. Therefore, the corrected color value of the color of interest can be determined from both the color of interest and the color calibration chart as captured within the image.

A search query is determined based on the corrected color value (104). The search query can be said to be an appearance-encoded search query, in that it encodes an appearance of an object, property, or other item, since the search query is based on the corrected color value. The search query may be a structured query language (SQL) query, or may be a query formatted for use with an existing general purpose or special purpose search engine available over the Internet or otherwise.

In one implementation, the search query includes the corrected color value itself. For example, if a user is searching for colors similar to the corrected color value, the search query may include just the corrected color value. In this respect, for instance, a SQL query can be generated by wrapping the corrected color value within a SQL-formatted wrapper that is understandable by a SQL database. As another example, if a user is search for a particular type of thing, such as a car, for instance, then the search query may include both the text "car" and the corrected color value. In this respect, for instance, a SQL query can be generated by wrapping both the corrected color value and the aforementioned text within a SQL-formatted wrapper. The search query is appearance encoded because it includes the corrected color value.

In another implementation, the search query includes one or more natural language search terms generated from the corrected color value. The natural language search terms may be text that represents in words the closest color to the corrected color value that can be so represented. For example, if the corrected color value represents a shade of mauve, the search query may include the term "mauve," and if a user is searching for cars having this color, the search query may also include the term "car." A SQL query may thus be generated by wrapping the natural language search terms by themselves, or in addition to the item having this appearance, within a SQL-formatted wrapper. The search query is appearance encoded because it includes the natural language search terms determined from the corrected color value.

Generating natural language terms from the corrected color value can be determined in a variety of different ways. A look-up table may be employed that maps ranges of corrected color values to various terms. More algorithmic approaches may also be employed.

A database is searched using the search query to determine search results that have appearance attributes with colors matching or similar to the corrected color value encoded within the query (106). The database may be a general-purpose search engine, like those commonly accessible over the Internet. The database may be a special-purpose search engine as well. For example, there may be a database of motor vehicles that denote different cars and light trucks by the precise colors in which they are available. As another example, there may be a database of paint colors that denote different paints from the same or different suppliers by the precise colors in which such paint is available.

Each search result has an appearance attribute having a color matching or similar to the corrected color value to some degree (i.e., by more than a threshold). For example, a user may be searching for cars having a particular color represented by the corrected color value. Each search result may specify the manufacturer, year, model, and trim of a car. Each search result also has an appearance attribute that specifies the color of the car, which matches the corrected color value to some degree. The more entries there are that have appearance attributes matching or similar to the corrected color value, the closer the search results will be to the corrected color value encoded within the search query.

The search results can be ordered by the proximity of the colors of their appearance attributes to the corrected color value encoded within the search query, particularly where the search query includes the corrected color value itself, such as CIELAB color scale coordinates or color channel values of color channels of a color space. For example, assume the corrected color value is abstracted as the color value X, which may itself be or include a number of color channel values. The search results are thus ordered by how closely their color values are to X in this example.

The search results can be ordered by how closely they are tagged with natural language terms matching the natural language search terms of the search query generated from the corrected color value. For example, assume the search query contains the natural language search terms "deep mauve." A search result tagged with the natural language terms "dark mauve" is likely to then be ordered as more close to the search query than a search result tagged with the natural language terms "light mauve."

Different types of techniques are thus amenable to construction of the search query and the ordering of the search results. A complex query that integrates different optical property values may yield search results that are sorted using a technique for integrating different such metrics, such as Kalman filtering. Dynamic user weighting of different optical property values—i.e., different appearance attributes—may be employed to ensure that the search results accurately reflect the appearance encoding within the search query where the search query includes multiple optical property values.

The search results may be filtered or sorted in other ways as well, such as based on retail and commerce constraints, item location, quantities available, special offers, and other factors. For example, a user may be interested in purchasing a new car having a particular color. In this respect, search results that are for cars have the right color but that are not currently manufactured, or are not in stock at dealerships near the user, may be excluded.

The search results are output (108). For instance, a user initiating a search on his or her mobile device may view the search results on the device. The search results may be output in other ways as well. As one example, a user interesting in purchase a car of a desired color of interest may have the search results sent to selected dealerships that have such vehicles on the lot, which may then contact the user to set up a test drive, send the user a physical letter or an electronic mail with the requested information on the product with the requested color, and so on.

Figure 2:
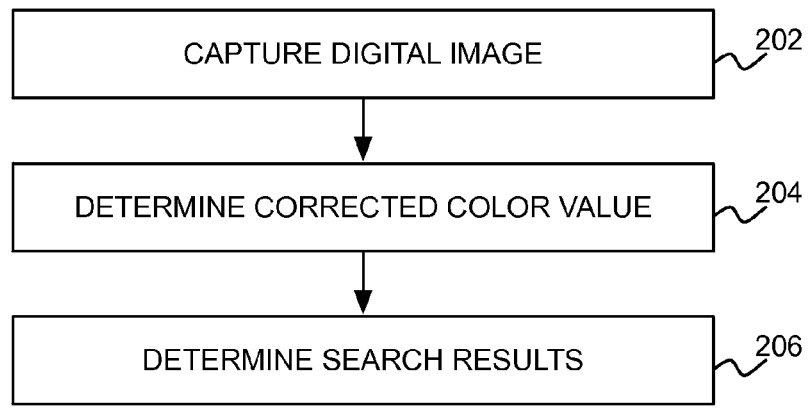
FIG. 2 is a flowchart of an example method for acquiring search results that match a color of interest captured within a digital image that is consistent with the method of FIG. 1 but is presented from a perspective of a mobile device.

FIG. 2 shows an example method 200 that is consistent with the method 100 but that is from the perspective of a mobile device of a user, like a smartphone. The method 200 may be implemented as computer-readable code executable by a processor of the mobile device. The computer-readable code can be stored on a non-transitory computer-readable data storage medium of the mobile device.

The mobile device captures a digital image of a physical scene including a color of interest and a physical color calibration chart (202). The mobile device determines a corrected color value of the color of interest (204). In one implementation, the mobile device computes the corrected color value itself. In this implementation, the mobile device thus includes the logic for computing the corrected color value from the color of interest and the chart as captured within the image.

In another example implementation, the mobile device is communicatively connected to a computing device like a server computing device, and more generally a system, over one or more networks such as mobile networks like 3G and 4G mobile networks, the Internet, and other types of networks. In this implementation, the mobile device can transmit the uncalibrated digital image to the computing device over the network. The computing device includes the logic for computing the corrected color value from the color of interest and the chart as captured within the image, and thus computes the corrected color value from the image received from the mobile device. The computing device may return the corrected color value back to the mobile device, which thus receives the corrected value from the system.

The mobile device is said to determine search results obtained by a database being searched using a search query based on the corrected color value (206). In one implementation, the mobile device may itself generate the search query as has been described. In this implementation, the database may be preloaded into the mobile device, in which case the mobile device can perform the search itself to generate the search results. As another example, the mobile device may query a database that is located external to the device, such as by transmitting the search query to a search engine that acts as a front end for the database, and receiving back in response the search results.

In another implementation, the mobile device may determine the search query using the aforementioned system. For example, the mobile device may transmit the digital image to the system, which directly determines the corrected color value and the search query. As another example, the mobile device may transmit the corrected color value to the system, where the corrected color value has been determined either directly by the mobile device or by the same or different system. In either example, the mobile device may receive the search query back from the system such that the mobile device effectuates the search of the database, or the system itself may conduct the search of the database and return the search results back to the mobile device.

Therefore, in varying implementations the mobile device can perform up to all aspects of the method 100 that has been described. For instance, if the mobile device includes the logic to perform each part of the method 100, then the method 200 is executed by the mobile device without assistance from any external or remote system. At the other extreme, the mobile device may just capture the digital image and display the search results to the user, such that it is said the device determines the corrected color value, the search query, and/or the search results with the assistance of an external system. For example, the mobile device in such an implementation may capture the digital image, determine the corrected color value, and/or determine the search query, but transmit the search query to an external system that acts as the front end of the database for the actual performance of the search.

Figure 3:
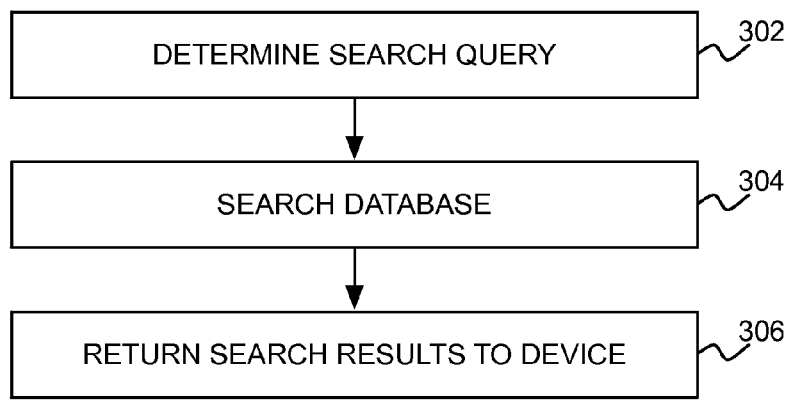
FIG. 3 is a flowchart of an example method for acquiring search results that match a color of interest captured within a digital image that is consistent with the method of FIG. 1 but is presented from a perspective of a computing system interacting with a mobile or other device.

FIG. 3 shows an example method 300 that is consistent with the method 100 but that is from the perspective of a computing system. The computing system determines a search query based on a corrected color value determined from a color value of interest and a color calibration chart captured within a digital image (302). The digital image can be received from a device like a mobile device. The system may receive just the digital image from the device, and determine the corrected color value itself, or the system may receive just the corrected color value from the device without receiving the digital image.

The computing system searches a database using the search query to determine search results (306), as has been described. The database may be stored on a storage device of the computing system, such as a storage-area network (SAN) or other type of storage device, and the system may search the database by querying the database itself. In another implementation, the system may transmit the search query to a different system, such as a system running a general-purpose search engine, and receive the search results back from this other system. In either case, however, it is said that the system itself searches the database, either directly or indirect.

The computing system returns the search results to the device from which the digital image and/or the corrected color value has been received (306). The system in this respect may be operated by a service provider as a service. The service may be provided for free to device users, where, for instance, advertisers and/or parties selling or manufacturing items within the database pay the provider. The service may be provided by charging the users of the devices in another implementation as well.

Figure 4:
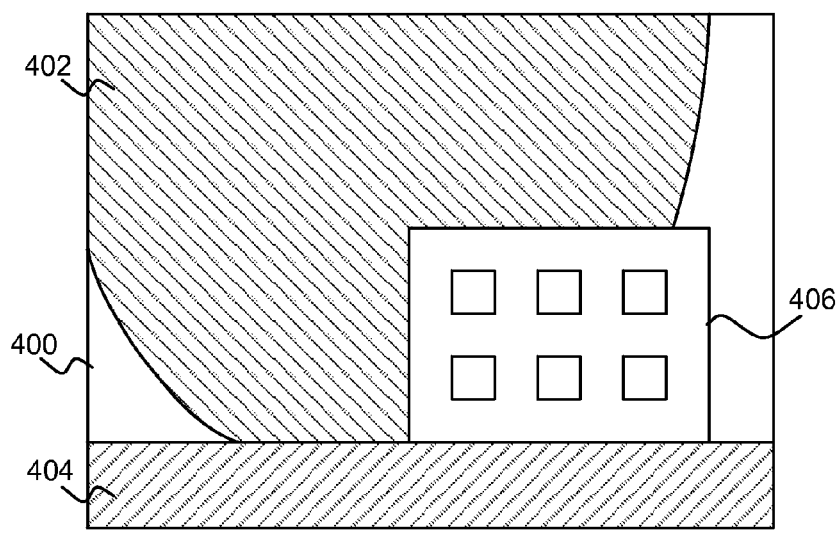
FIG. 4 is a diagram of an example uncalibrated digital image of a color of interest and a physical color chart within a physical scene.

FIG. 4 shows an example uncalibrated digital image 400 captured by a mobile device like a smartphone. A user may in the course of his or her daily life encounter a physical object like a vase 402 sitting on a table 404, and determine that the vase 402 has a color that the user thinks would be perfect for a particular project he or she is working on. That is, the color of the vase 402 is the color of interest. Therefore, the user may remove the physical color calibration chart 406 that he or she keeps in a wallet or a purse, and places it on the table 404 against the vase 402. The user may also hold up the chart 406 by or against the vase 402. The user then uses his or her mobile device to snap a picture of the resulting physical scene to capture the digital image 400.

Figure 5:
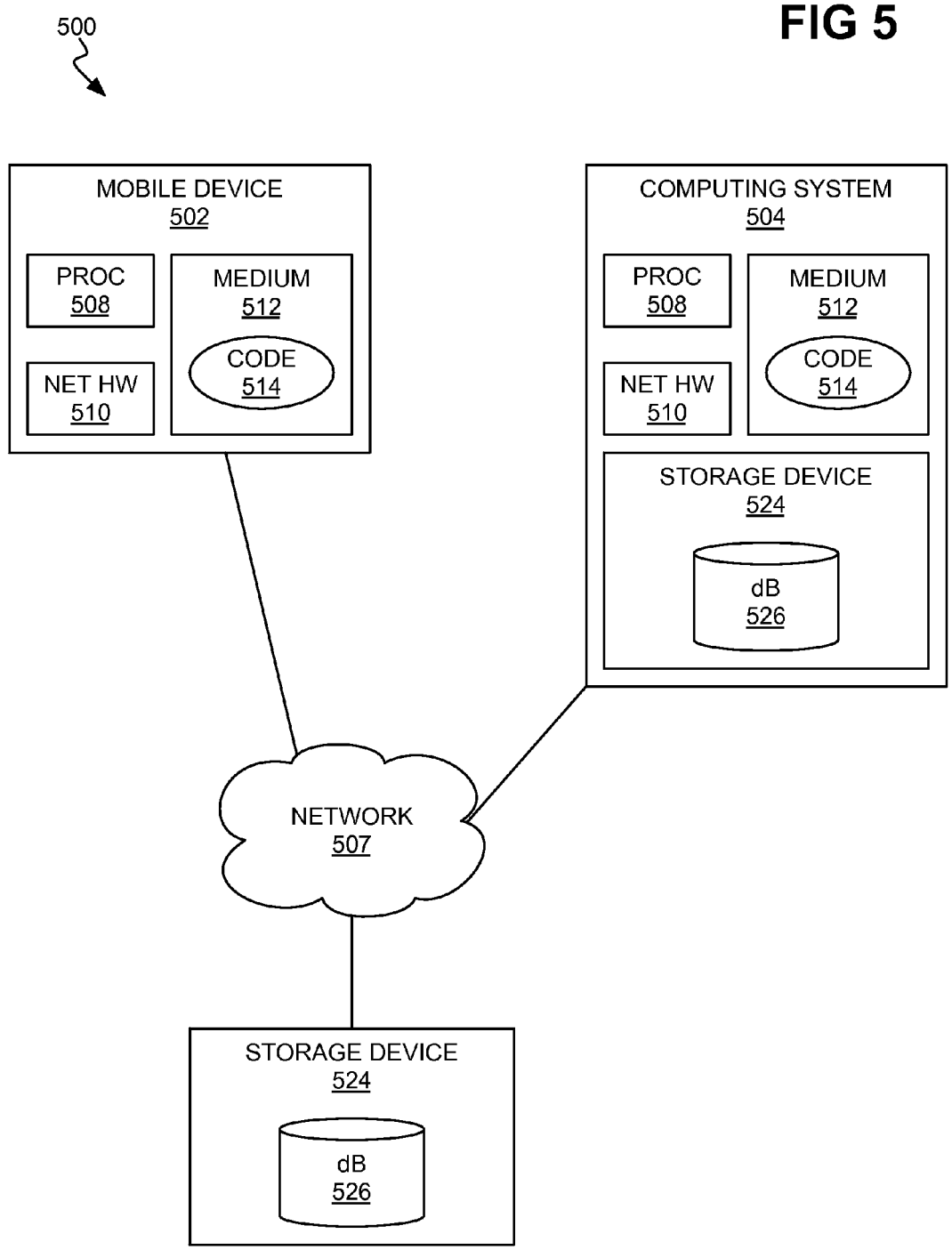
FIG. 5 is a diagram of an example architecture including the mobile device that performs the method of FIG. 2 and the system that performs the method of FIG. 3.

FIG. 5 shows an example system 500. The system 500 can include one or more of a mobile device 502, a computing system 504, and a search engine 506, which are communicatively connected to one another via a network 507. The network 507 may be or include mobile networks, the Internet, intranets, extranets, and other types of networks as well.

The mobile device 502 includes at least a processor 508, network hardware 510, and a non-transitory computer-readable data storage medium 512. The mobile device 502 can include an image-capturing mechanism, such as a CCD or a CIS, as well. The network hardware 510 can include a wireless transceiver to permit the mobile device 502 to communicate over the network 507. The computer-readable data storage medium 512, which may be nonvolatile semiconductor memory, stores computer-readable code 514 that is executable by the processor 508. The code 514 implements logic by which the mobile device 502 performs the method 200 that has been described.

The computing system 504 can be realized as one or more computing devices, such as servers. As such, the computing system 504 includes a processor 516, network hardware 518, and a non-transitory computer-readable data storage medium 520. The network hardware 518 may be or include a network adapter by which the system 504 communicates over the network 507. The computer-readable data storage medium 520, which may include semiconductor memory and/or magnetic media, stores computer-readable code 522 executable by the processor 516. The code 522 implements the logic by which the system 504 performs the method 300 that has been described.

In some implementations, the computing system 504 can include a storage device 524, which may be the same or a different storage than the non-transitory computer-readable data storage medium 520. The storage device 524 stores a database 526. In such implementations, the database 526 is that which the system 504 searches the search query for to acquire search results for the search query.

In implementations in which the system 500 includes the search engine 506, the search engine 506 also includes or has access to a database 528, against which the mobile device 502 and/or the system 504 submits the search query to acquire search results. The search engine 506 may be implemented over one or more computing devices, such as servers. The search engine 506 may be operated by a different provider than the service provider which operates the computing system 504. In some implementations, the system 500 includes both the database 526 at the system 504 and the database 528 at the search engine 506, whereas in other implementations, the system 500 includes just the database 526 or just the database 528.

The system 500 thus illustrates that there can be up to three different types of parties via which techniques disclosed herein are operable. End users operate mobile devices like the mobile device 502. One type of service provider operates the computing system 504. A different type of provider can operate the search engine 506. For example, the search engine 506 may be a general-purpose search engine accessible over the Internet.

We claim:

1. A system comprising:
   networking hardware to receive from a device to which the networking hardware is communicatively connected one of:
   a digital image of a physical scene including an optical property of interest and a physical optical property calibration chart;
   a corrected optical property value of the optical property of interest determined based on the physical optical property calibration chart and the optical property of interest within the digital image;
   a processor; and
   a non-transitory computer-readable data storage medium storing computer-readable code executable by the processor to:
   if the networking hardware receives the digital image and not the corrected optical property value, determine the corrected optical property value based on the physical optical property calibration chart and the optical property of interest within the digital image;
   determine a search query based on the corrected optical property value;
   search a database using the search query to determine search results for the search query that have appearance attributes with optical properties at least similar to the corrected optical value; and
   return the search results to the device via the networking hardware.

2. The system of claim 1, wherein the networking hardware is to receive from the device just the digital image and not the corrected optical property value, and the computer-readable code is executable by the processor to further determine the corrected optical property value of the optical property of interest based on the physical optical property calibration chart and the optical property of interest within the digital image.

3. The system of claim 1, wherein the networking hardware is to receive from the device just the corrected optical value as determined by the device and not the digital image.

4. The system of claim 1, further comprising:
   a storage device storing the database,
   wherein the computer-readable code is executable by the processor to search the database by directly querying the database using the search query.

5. The system of claim 1, wherein the database is stored on a different system managed by a search provider different from a service provider managing the system,
   wherein the computer-readable code is executable by the processor to search the database by transmitting the search query to the different system via the networking hardware and by receiving from the different system in response the search results via the networking hardware.

6. The system of claim 1, wherein the computer-readable code is executable by the processor to determine the search query as including the corrected optical property value.

7. The system of claim 6, wherein the computer-readable code is executable by the processor to search the database to determine the search results as ordered according to proximity of the optical properties of the appearance attributes of the search results to the corrected optical property value.

8. The system of claim 1, wherein the computer-readable code is executable by the processor to determine the search query as including one or more natural language search terms from the corrected optical property value.

9. The system of claim 8, wherein the computer-readable code is executable by the processor to search the database to determine the search results ordered according to closeness matching of natural language terms within the search results to the one or more natural language search terms.

10. A non-transitory computer-readable data storage medium executable by a mobile device having image-capturing capability to perform a method comprising:
   capturing a digital image of a physical scene including an optical property of interest and a physical optical property calibration chart;
   determining a corrected optical property value of the optical property of interest based on the physical optical property calibration chart and the optical property of interest as captured within the digital image;
   determining search results obtained by a database being searched using a search query based on the corrected optical property value, the search results having appearance attributes with optical properties at least similar to the corrected optical property value; and
   outputting the search results.

11. The non-transitory computer-readable data storage medium of claim 10, wherein determining the corrected optical property value comprises:
   transmitting the digital image to a system to which the mobile device is communicatively connected; and
   receiving the corrected optical property value, as determined by the system, from the system.

12. The non-transitory computer-readable data storage medium of claim 10, wherein determining the corrected optical property value comprises computing the corrected optical property value at the mobile device itself.

13. The non-transitory computer-readable data storage medium of claim 10, wherein determining the search results comprises generating the search query at the mobile device itself.

14. The non-transitory computer-readable data storage medium of claim 10, wherein determining the search results comprises receiving the search query from a system to which the mobile device is communicatively connected after the mobile device has transmitted the digital image and/or the corrected optical property value to the system.

15. The non-transitory computer-readable data storage medium of claim 10, wherein determining the search results comprises searching the database as preloaded into the mobile device, by the mobile device.

16. The non-transitory computer-readable data storage medium of claim 10, wherein determining the search results comprises receiving the search results from a system to which the mobile device is communicatively connected after the mobile device has transmitted one or more of the digital image, the corrected optical property value, and the search query to the system.

* * * * *